US010706472B1

(12) United States Patent
Myers et al.

(10) Patent No.: US 10,706,472 B1
(45) Date of Patent: Jul. 7, 2020

(54) SYSTEMS AND METHODS FOR ANALYSIS OF DIGITAL ASSET DEVELOPMENT AND TRANSACTION BEHAVIORS

(71) Applicant: Flipside Crypto, Inc., Boston, MA (US)

(72) Inventors: James F. Myers, Boston, MA (US); David L. Balter, Boston, MA (US); Eric C. Stone, Boston, MA (US)

(73) Assignee: Flipside Crypto, Inc., Boston, MA (US)

( * ) Notice: Subject to any disclaimer, the term of this patent is extended or adjusted under 35 U.S.C. 154(b) by 0 days.

(21) Appl. No.: 16/526,424

(22) Filed: Jul. 30, 2019

Related U.S. Application Data

(60) Provisional application No. 62/711,795, filed on Jul. 30, 2018.

(51) Int. Cl.
*G06Q 40/00* (2012.01)
*G06Q 40/04* (2012.01)
*G06N 7/00* (2006.01)
*G06Q 20/38* (2012.01)

(52) U.S. Cl.
CPC ............. *G06Q 40/04* (2013.01); *G06N 7/005* (2013.01); *G06Q 20/389* (2013.01); *G06Q 2220/00* (2013.01)

(58) Field of Classification Search
CPC ...... G06Q 40/00; G06Q 40/04; G06Q 20/389; G06Q 2220/00; G06N 7/005
See application file for complete search history.

(56) References Cited

U.S. PATENT DOCUMENTS

| 10,546,296 | B2* | 1/2020 | Narasimhan | G06Q 20/36 |
| 2017/0270527 | A1* | 9/2017 | Rampton | G06Q 20/102 |
| 2019/0073666 | A1* | 3/2019 | Ortiz | G06F 21/62 |
| 2019/0370813 | A1* | 12/2019 | Bravick | G06Q 20/223 |
| 2020/0027089 | A1* | 1/2020 | Kuchar | G06Q 20/065 |

* cited by examiner

*Primary Examiner* — Lalita M Hamilton
(74) *Attorney, Agent, or Firm* — Goodwin Procter LLP

(57) ABSTRACT

The fundamental health of a crypto-asset is determined based on factors associated with the development and utility of the crypto-asset. Developer activity data associated with the crypto-asset is received from one or more interfaces associated with one or more development servers associated with the crypto-asset, and a developer activity factor is calculated based on the developer activity data. A connection is established to a blockchain server that maintains a blockchain that tracks transactions associated with the crypto-asset, and transaction data for a plurality of the transactions is received from the blockchain server. A project utility factor is calculated based on a plurality of behavioral use cases derived from the transaction data, where the behavioral use cases are respectively associated with different uses of the crypto-asset. Then, a fundamental health score is determined for the crypto-asset based on the developer activity factor and the project utility factor.

22 Claims, 10 Drawing Sheets

SYSTEMS AND METHODS FOR ANALYSIS OF DIGITAL ASSET DEVELOPMENT AND TRANSACTION BEHAVIORS

CROSS-REFERENCE TO RELATED APPLICATION

This application claims priority to and the benefit of U.S. Provisional Patent Application 62/711,795, filed on Jul. 30, 2018, the entirety of which is incorporated by reference herein.

FIELD OF THE INVENTION

The present invention relates generally to cryptocurrency assets, and, more specifically, to methods and supporting systems for managing portfolios of cryptocurrencies and analyzing the properties of cryptocurrency assets.

BACKGROUND

Challenges arise in querying and characterizing blockchain transactions and nodes in order to engage in blockchain-based analytics. Available tools are not designed for analytical workloads. Existing open-source and other tools are designed for nodes, developers writing blockchain contracts, miners, exchanges, and so on. These types of users require a fundamentally different access pattern than those required for analytical use-cases. Different types of blockchain data need to be stored, structured, and accessed differently. Addresses, transfer style transactions, contracts, and contract method calls are fundamentally different entities. Blockchains are not as simple as "user A transferred 'X' to user B." All of these entities, depending on the access pattern and use-case, require unique storage choices.

Traditional data mining and machine learning approaches are insufficient to characterize nodes and transactions. Earlier approaches use traditional clustering algorithms coupled with some ground-truth tags to identify groups of addresses to illuminate behaviors. This probabilistic-only approach leads to a false representation of on-chain behaviors because there is typically insufficient data and unknown categories of classification to build a reliable probabilistic model, resulting in extremely high error rates. More accurate techniques for characterizing blockchain behaviors are needed.

Another challenge introduced by the trading of these crypto-assets relates to the responsibility for safeguarding the assets on behalf of clients. Enterprises interacting with blockchain-based products need to secure balances of digital assets. This means entrusting an individual(s) to safeguard private keys, which are subject to theft or loss. Traditional financial entities may not be qualified to securely custody these assets and, even if they are qualified, from a regulatory perspective they may not be legally entitled to this responsibility. In conventional schemes, asset custody services are provided by a third-party trust/service. In either case this simply results to pushing the problem onto a separate party (often the client themselves), and many clients do not want to be responsible for securing their own assets.

Further, conventional asset management systems use well-known statistics and financial results to value assets that are directly related to the assets' performance. For example, the expected performance or value of an equity may be based on historical earnings performance (or expected performance) of the company issuing the equity, quantitative analyses of the company, market capitalization, price to earnings ratios, and other technical data. Pricing for groups of assets (e.g., "funds" such as mutual funds, ETFs, etc.) may aggregate the values of the component assets that comprise the fund. Analysts use various combinations of these metrics to arrive at a perceived "value" of an asset.

While some of these same metrics may be used to value crypto-assets, many do not exist or are not as accurate as they may be for traditional assets. Moreover, the underlying structures and activities on which the crypto-assets are based are quite different. As a result, there is a need for new techniques for valuing these assets.

BRIEF SUMMARY

As used herein, the term 'crypto-asset' refers to any type or family of digital cryptographic-based asset, such as decentralized, tradeable tokens and coins, based on mathematical hashing, and secure transactions between two individuals or servers whereby the crypto-assets may be bought, sold, traded or used to purchase other assets. These tokens and coins can represent many different projects with different use-cases, from digital currencies, to computing infrastructure, to identity verification.

All transaction records of and between crypto-assets are recorded on a "blockchain"—a digital ledger in which transactions are recorded chronologically and publicly, and thus are freely available to anyone who wants to see and analyze the transactions. Importantly, the recordation and storage of the transactions is decentralized—that is, the records are stored on a plurality of servers, thus eliminating reliance on a centralized authentication or management entity.

The decentralized nature of the transactions, coupled with the unique aspects of crypto-assets introduces many challenges that do not exist for traditional financial instruments and asset classes.

To address these and other challenges, embodiments of the present invention provide techniques for assigning a valuation to crypto-assets based on novel data sources, attributes, and characteristics, and a mathematical framework that more accurately reflects the value of the asset than conventional approaches. More specifically, the framework considers various indications of developer activity related to the asset, a temporal, cross-exchange statistical analysis, a node/link clustering technique for identifying critical actors and activities across the asset's network, and an industry characterization framework for assessing how integral a particular project may be with regard to certain assets. Each of the scores calculated using the techniques referred to above may then be used as input into a resulting index calculation for the asset.

In another aspect of the invention, a protocol and supporting systems provide a decentralized, algebraic mechanism for implementing custodial and access services to the digital assets among many parties, thus safeguarding the digital assets without actually possessing custody or requiring asset owners to be responsible for safeguarding their own private keys, as misplacing keys is easy and theft of keys is a constant threat.

The protocol shards or splits private keys between multiple parties, where no single party can access the assets. In one case, shards are evenly distributed between a counsel (acting on behalf the client), the client and a service provider such that each party possesses a subset of the total number of shards, and where some larger subset of the total is necessary to regenerate the private key. Therefore, no single party can act alone and some number of shards (the required number minus 1) can be compromised without risk of loss.

The number of shards generated and minimum number that can be recombined to generate the original key can be based, for example, on the number of parties involved.

In one aspect, a computer-implemented method for determining the fundamental health of a crypto-asset comprises receiving, from one or more interfaces associated with one or more development servers associated with a crypto-asset, developer activity data associated with the crypto-asset; calculating a developer activity factor based on the developer activity data; establishing a connection to a blockchain server that maintains a blockchain that tracks transactions associated with the crypto-asset; receiving, from the blockchain server, transaction data for a plurality of the transactions; calculating a project utility factor based on a plurality of behavioral use cases derived from the transaction data, wherein the behavioral use cases are respectively associated with different uses of the crypto-asset; and determining a fundamental health score for the crypto-asset based on the developer activity factor and the project utility factor. Other aspects of the foregoing include corresponding systems and computer-executable instructions stored on non-transitory storage media.

Various implementations of the aspects can include one or more of the following features. The developer activity data can comprise code commits, code comments, number of code pulls, frequency of code pulls, number of code pushes, frequency of code pushes, number of unique contributors, number of code forks, number of releases, frequency of releases, number of watches on code, number of issue reports, frequency of issue reports, number of posts to electronic message boards associated with the crypto-asset, and/or frequency of posts to electronic message boards associated with the crypto-asset. Calculating the developer activity factor can include defining a time-based factor to account for a temporal aspect of the developer activity data. Calculating the developer activity factor can include defining a plurality of observed activity variables based on the developer activity data; performing factor analysis by identifying factors defining a covariance of the observed activity variables; and measuring a proportion of variance from results of the factor analysis. The behavioral use cases can include active trading, passive trading, and/or intended use. Calculating the project utility factor can include: identifying addresses in the blockchain that have made at least one transfer of a crypto-asset; and classifying activities associated with the addresses into the behavioral use cases. Calculating the project utility factor can further comprise filtering the activities by excluding unintended behaviors associated with the addresses. Calculating the project utility factor can comprise differentiating among behaviors exhibited in the transaction data using probabilistic modeling, heuristics, and/or manual inspection. Calculating the project utility factor can comprise: forming clusters of similar transaction participants based on the transaction data; classifying the clusters into the behavioral use cases; and calculating a time-series of proportions of the behavioral use cases. Determining the fundamental health score can comprise calculating a covariance-weighted average using the developer activity factor and the project utility factor. A market maturity factor can be calculated for the crypto-asset based on trading volume, current price, total project value, and/or volatility, and wherein the fundamental health score is further based on the market maturity factor.

The details of one or more implementations of the subject matter described in the present specification are set forth in the accompanying drawings and the description below.

Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings.

DETAILED DESCRIPTION

According to various aspects and embodiments of the invention described herein, a novel valuation framework for crypto-assets uses models and metrics unique to the cryptocurrency industry. Specifically, data sources that are available to quantify and assess the fundamental health (activity and value) of crypto-assets are based on the existence of the blockchain (and the activities inherent to its use) and the activity metadata characterizing work and community involvement in the code repositories for each crypto-asset project. The inclusion of other factors, which may include traditional measures used to value assets, is also contemplated. In one implementation, the fundamental health of a crypto-asset is represented by a high-level metric, also referred to herein as a Fundamental Crypto Asset Score ("FCAS"), that takes into account three primary factors: Developer Activity, Project Utility, and Market Maturity, each of which is further described below. FCAS is a weighted combination of these factors, two of which are calculated irrespective of market-based metrics and focus instead on the blockchain and development ecosystem to derive value.

Figure 1:
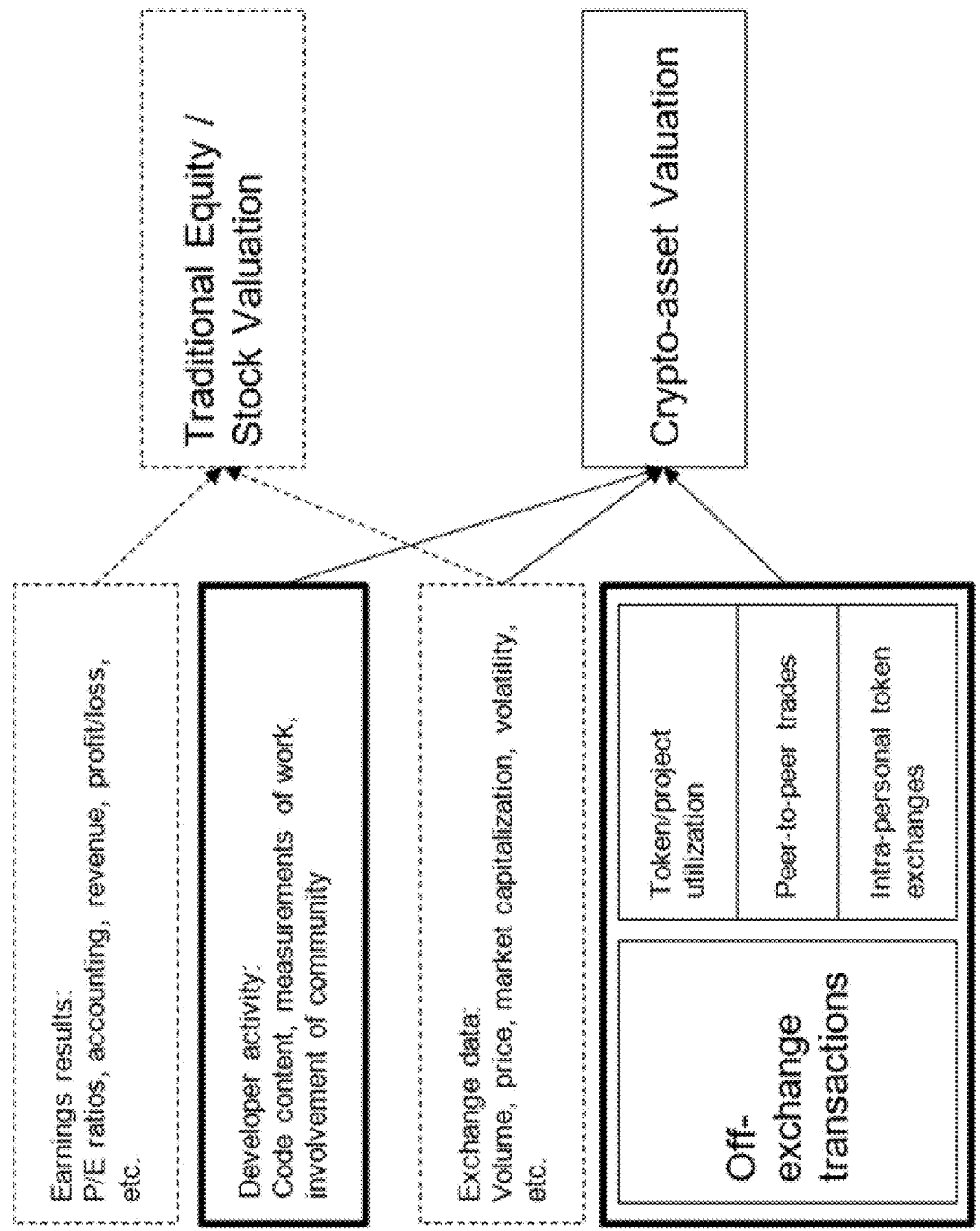
FIG. 1 is a block diagram depicting general valuation factors for conventional financial assets and crypto-assets.

FIG. 1 illustrates how traditional metrics (shown in dashed boxes) are used to derive values for traditional asset classes such as stocks. Alternatively, activities such as the amount of code deposited into a repository, the frequency of deposits, number of unique contributors, and the quality of codebase may be used as a proxy for more traditional measures (e.g. P/E ratio, etc.) and drive a valuation calculation.

Other "off-exchange" transactional data may also be used as input into the valuation process, such as the utilization rates or frequencies of the tokens generated for the project, the volume and/or frequency of peer-to-peer trades, and intra-personal token exchanges (e.g., users exchanging tokens for some other asset, including cash).

Certain conventional measures such as overall trading volume, current price (or prices), total project value (e.g., "market capitalization"), volatility measures, and others may also be included in the valuation calculations.

Figure 2:
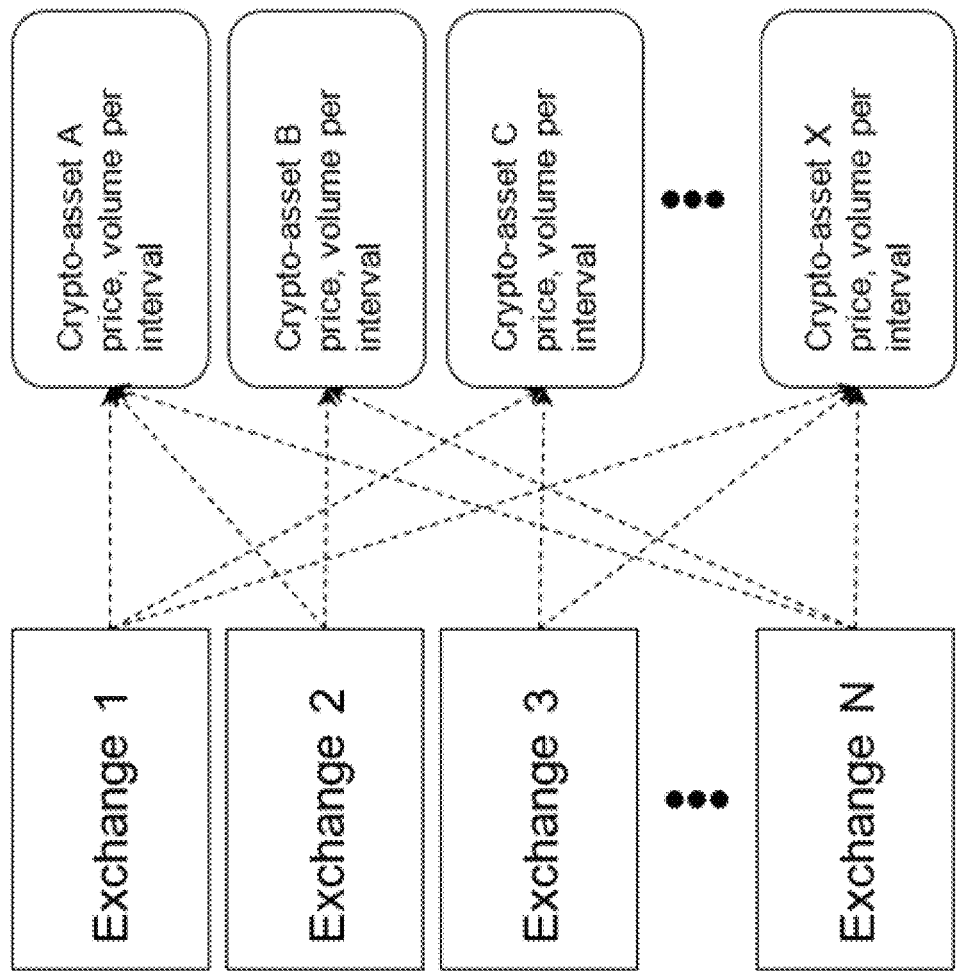
FIG. 2 is a block diagram depicting an example mapping of exchanges to crypto-assets.

Unlike traditional financial assets such as stocks and ETFs, crypto-assets can and do trade on multiple exchanges, including both central exchanges, and decentralized projects that act as exchanges between crypto-assets. As a result, the current and historical price of a given crypto-asset is a major factor in any valuation metric, even though different exchanges offer different prices at different times for different crypto-assets. The current approach therefore aggregates data across all of the various exchanges and projects that influence crypto-asset prices. More specifically, a volume-weighted aggregation of all available exchange data is used to provide consistent real-time and historical price data for crypto-assets. FIG. 2 illustrates the many-to-many mapping of exchanges to crypto-assets.

Once the various development activities and off-exchange transactions (divvied into utility, peer-to-peer, and intra-personal exchanges from one token/coin to another) are established as useful metrics, the process of building an index involves collecting and storing the data, analyzing and summarizing the data, and assigning value to the assets.

One factor used to determine an asset value (e.g., FCAS) is "Developer Activity," which can be based on information relating to developer and community contributions and codebases. Such information used in determining Developer Activity may be collected from public code repositories, such as GitHub and BitBucket, or private or proprietary repositories and source control systems. The information can be automatically collected through various interfaces, such as application programming interfaces (APIs) or web scraping browser-based interfaces. The repositories and source control systems provide access to a historical record of all contributions made to any public project's code base, including community involvement in the form of comments, bug reports, and conversations about features and challenges faced. This data is collected from some or all available repositories and can include, for example, code commits, code comments, number of code pulls, frequency of code pulls, number of code pushes, frequency of code pushes, number of unique contributors, number of code forks, number of releases, frequency of releases, number of watches on code, number of issue reports, frequency of issue reports, number of posts to electronic message boards, and frequency of posts to electronic message boards. In addition to these metadata, the uniqueness of each codebase can be assessed, including identifying those codebases that have taken pieces from other projects, and what those pieces are.

To account for the temporal aspect of the data, a model for defining a time-based factor may be used such as:

$$y_t = \alpha_t + \beta_t^t \xi_t + \varepsilon_t$$

assuming that factor loadings vary by time, primarily because more crypto-assets exist today than six months ago, and different types of work are being done on them now than was being done six months ago.

In this instance, y is all the observed activity variables from crypto-asset repositories, a is the intercept vector which can also vary by time; $\xi$ is the (unobserved) factor loadings with weights $\beta$; and $\varepsilon$ is noise in the model (e.g., error, isolated variables that do not fit into a factor, random variance, etc.). This system is solved for $\beta$ by rotating the matrix of observed, normalized, time-differenced variables, and performing eigenvector decomposition of the resulting matrix. This approach can be applied to identify the factors that define the covariance of our variables, as well as the scores between them.

Figure 3:
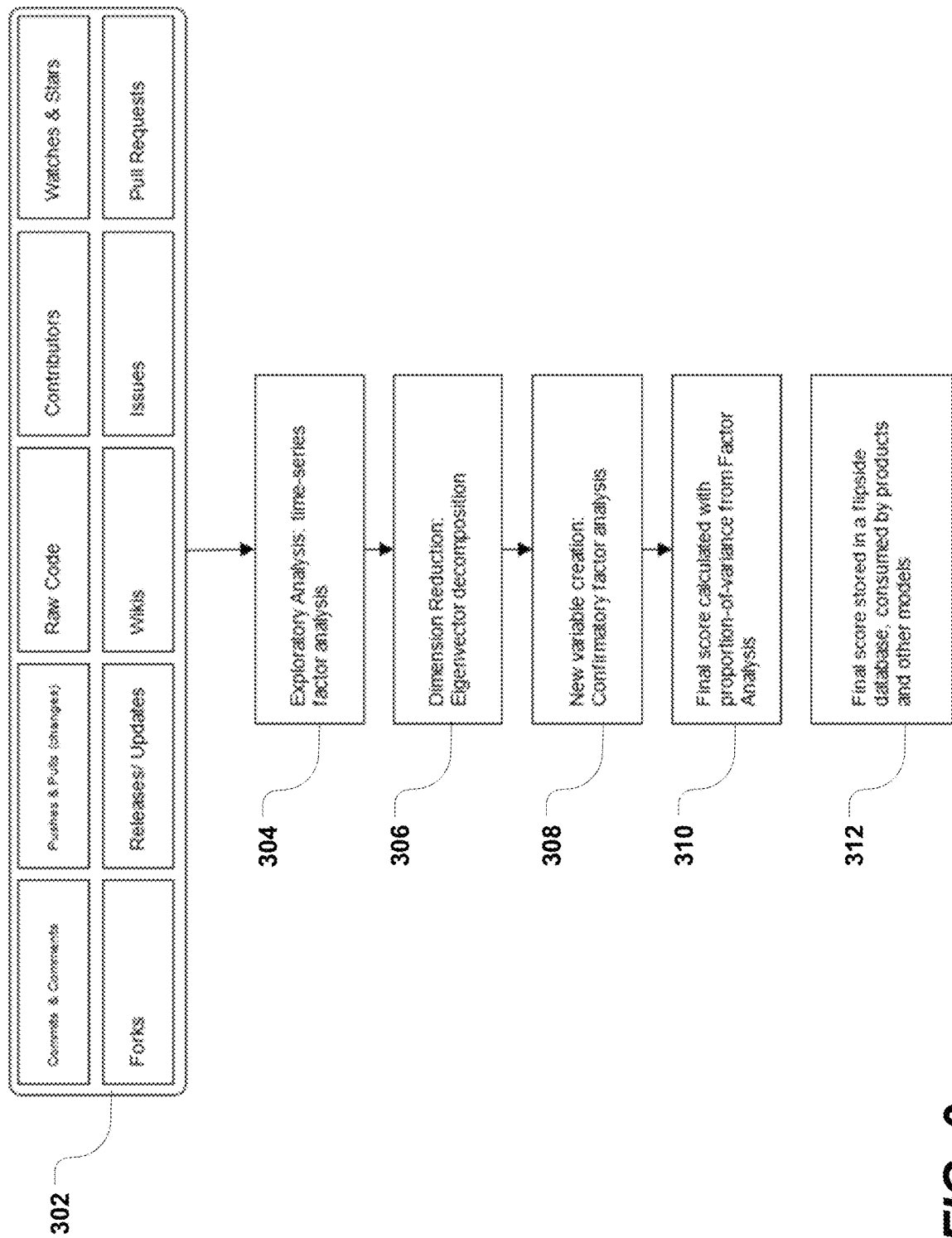
FIG. 3 depicts a method for determining a developer activity factor according to an implementation.

FIG. 3 illustrates a high-level diagram of the types of variables included and the process for going from variables to factor scores, as also described in the previous paragraphs. The variables 302 can include those noted above (e.g., commits, comments, pushes, etc.). In step 304, a time-series factor analysis is performed using the collected variable data, and eigenvector decomposition is performed on the results (step 306). In steps 308 and 310, confirmatory factors are identified and a score (developer activity factor) is calculated with proportion-of-variance from these factors. Finally, in step 312, the factor is stored in a database and can be retrieved as needed by products and other models.

Another factor used to determine an asset value (e.g., FCAS) is "Project Utility." For the various crypto-assets, a blockchain maintains a record of all transactions that have ever occurred for a given token or coin, and each blockchain can be accessed by establishing a server that communicates with the blockchain. Once this connection has been established, a copy of every transaction for every crypto-asset can be downloaded and stored in a local database. Generally, each crypto-asset transaction comprises distinct types of users: active traders, passive traders/holders/speculators, and actual users—those who actually use a coin or token to engage with a project's intended purpose (e.g., providing storage, computing resources, access to intellectual property, etc.).

Figure 4:
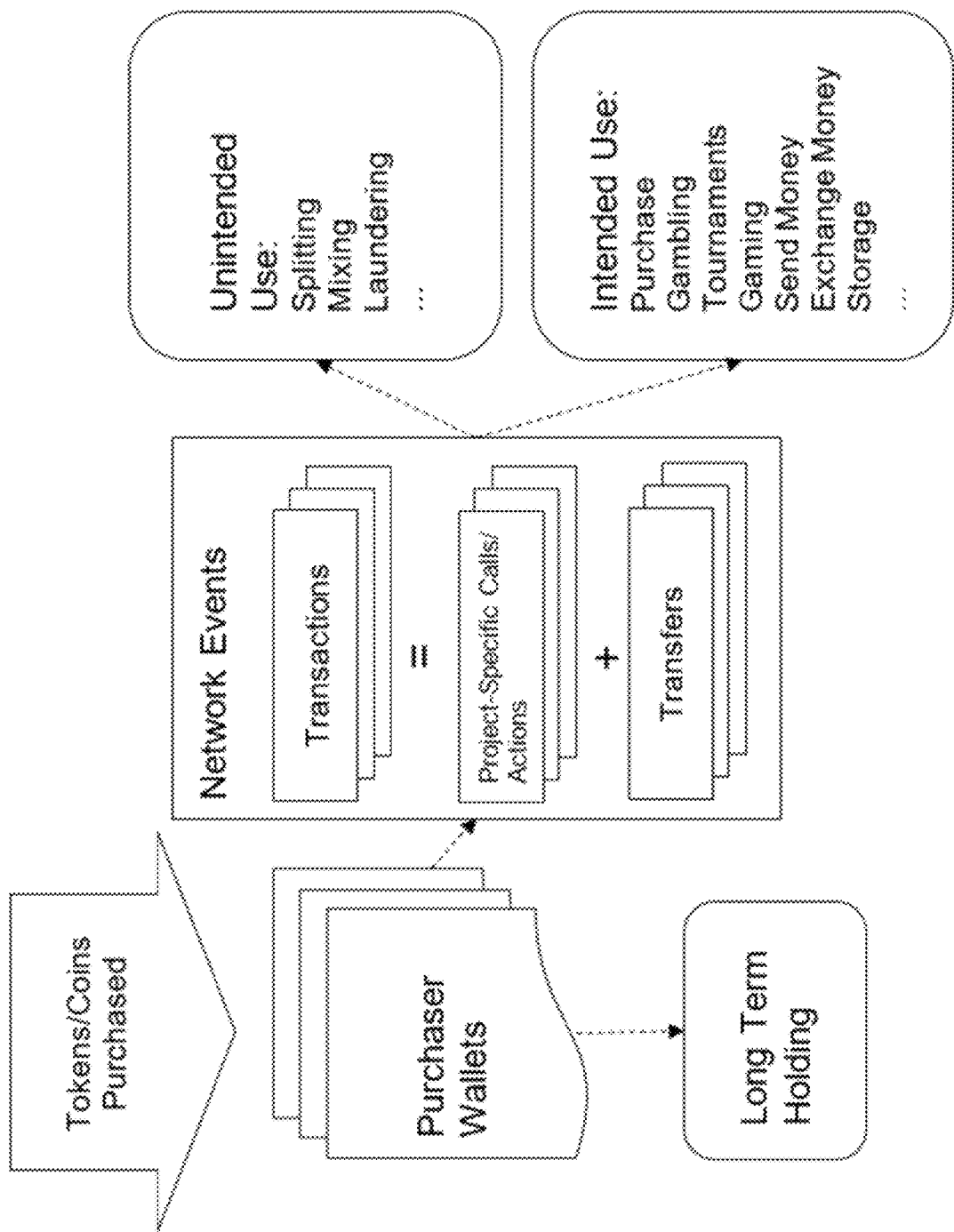
FIG. 4 is a block diagram depicting an example characterization of communities of blockchain transaction participants.

Embodiments of the invention capture and cluster some or all of the different accounts ("nodes") that are active on a given crypto-asset into groups of similar accounts, referred to herein as "communities" by identifying links between the nodes and using those links to create the communities of nodes. In this manner a single node can be assigned to multiple communities, which allows in turn for a nested, or overlapping network structure. This also reveals the key nodes within each community, and enables the characterization of particular communities as speculators, traders, or users of specific crypto-assets, as depicted in FIG. 4.

Several mechanisms can be used to differentiate among the types of behaviors (e.g., investing, holding, selling, ordinary use, etc.) associated with crypto-assets, as follows:

Manual inspection: Block explorers are used to study transaction and account behaviors, transactions are followed through the ecosystem to flag particular addresses and transaction types known to belong to a particular category with high or absolute (100%) certainty.

Heuristics: Heuristics are used to understand the life-cycle of suspicious or irrelevant addresses and flag them as such. Heuristics can also be developed from the above manual activities. For example, to build archetypes for exchange heuristics, coins and tokens can be purchased from certain exchanges and products/services, and the flow of the coins/tokens can be tracked to isolate and define the unique behaviors of the addresses associated with the coins/tokens transactions.

Probabilistic modeling: Machine learning models, e.g., Random Forest, are used to identify groups of addresses and transactions that fall into particular categories to identify different types of address and transaction types.

In some implementations, blockchains are parsed and addresses that have made at least one transfer at any point in history are tagged (as an example, for the Ethereum network, this amounts to about 45-50 million addresses). Ground truth labels are derived by aggregating information from various sources, including first-hand observations and research, data partners, and third parties, and compiling the aggregated information into a graph network. Characteristics associated with the addresses are identified over the history of the blockchain, including, for example, who the address is connected to, how often they are active, and to what extent (volume).

Many addresses are either inactive, or account for very little activity on the network. For example, more than 25% of Ethereum addresses are single use addresses, created only to fulfill a single transfer, typically as an intermediary between an exchange and the wallet of the users of the exchange. The remaining wallets are characterized as belonging to an exchange; decentralized exchange; crypto project (whether the project in question or another); bot or automated internal system; or a potential user, and each address can then be further assigned to a sub-category.

After address and transaction tags have been extensively verified and tested, the heuristics, models, and known ground-truth address and transaction types are algorithmically applied to all participants and transactions on the tracked blockchains. To facilitate these operations, the system can incorporate an efficiently managed database that allows for quick parsing of the entire history of a given blockchain and the application of models both historically and on an ongoing, regular basis.

Advantageously, the combination of the tags and behavioral heuristics allows for the present system to answer specific questions about blockchains. For example, centralized and decentralized exchange activity is isolated from user activity, so when a user of the system queries how many people are using a product (e.g., cryptocurrency) in a particular way, the results can be easily obtained by querying the managed database. The results can further be subset as necessary to highlight particular patterns or user types.

All activity can now be classified as belonging to one of several categories. The data is then cleaned to exclude particular types of unintended behaviors (e.g., mixing, intra-exchange movement, and likely junk or pollution). Next, the system calculates monetary-based (e.g., USD) volumes, transaction counts, and account tallies that are clean representations of intended activity, and these are segmented to differentiate between transactions that are likely related to an investment vs. those that are likely related to intentional use of a project. Thus, Project Utility represents an aggregate of total intentional on-chain activity; likely utility events/transactions; and numbers of active users in each category. The score also incorporates the extent to which a given coin's total supply is active or stagnant.

Such an approach improves upon conventional valuation metrics that rely on aggregate network and market data to compare the relative value of a blockchain based project. However, there are drawbacks to this approach such that it relies upon the veracity of the reported number of coins in circulation (this number, whether truthful or not, is also subject to manipulation by project administrators), and the resulting metrics are imprecise representations of crypto-asset utility, and even if consistently accurate, could contain undifferentiated information about peer-to-peer transactions, utility, speculation, decentralized exchanges, among others. If used to directly compare two given crypto-assets, this approach assumes that the relative proportions of those different types of transactions are irrelevant. The inventive techniques described herein address these shortcomings by calculating the number of transactions and accounts responsible for both on- and off-exchange activity while also accounting for the different types of off-exchange activity more overtly than other traditional approaches.

Figure 5:
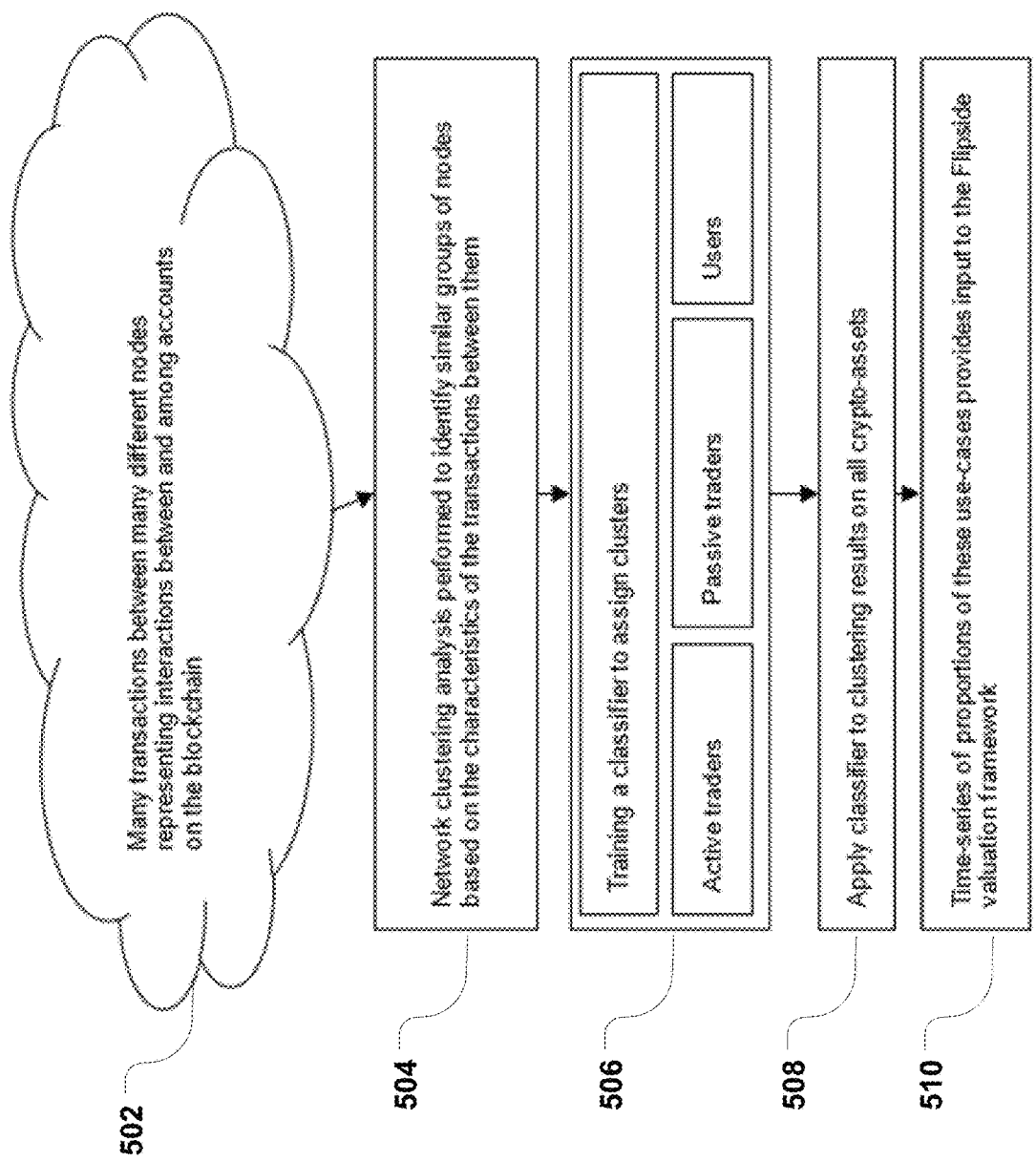
FIG. 5 depicts a method for determining a project utility factor according to an implementation.

Clusters of true exchangers, active individual users (or groups who frequently trade together), and instances of actual token use are identified and characterize each community (set of nodes). A classifier model may then be trained to identify subsequent nodes based on established known base-case cluster's throughput, dollar amounts, variance, contract types, and regularity. Such a technique is depicted in FIG. 5. More specifically, network clustering analysis is performed (step 504) to identify similar groups of nodes based on the characteristics of the transactions between them (from data 502). In step 506, a classifier is trained to assign clusters to behavioral use-cases (e.g., active traders, passive traders, users). In step 508, the classifier is applied to the crypto-asset clustering results from step 504. A score (project utility factor) is calculated by performing a time-series of proportions of the use-cases (step 510), and the score can be stored for use in a valuation framework (e.g., calculating FCAS).

In other embodiments, techniques for classifying projects based on their importance and "level" within a hierarchical structure are used as input into a valuation calculation. Unlike conventional industry sectors used to classify equities, the disclosed approach provides a framework for characterizing projects as one of foundational, supportive, or long-tail projects.

Foundational projects are identified as being well-established, large-cap, mature projects, broken into two subclasses: store-of-value, or currency-style crypto-assets that support store-of-value or peer-to-peer transaction technologies (like bitcoin or zcash), and projects with their own blockchains upon which other projects are built (like ethereum or EOS).

The next level in the hierarchy includes projects that sit atop a mature computation-project (typically) and provide additional infrastructure to the crypto-asset space. Decentralized exchanges, decentralized computing and storage, identity verification, and other projects intended to expand and support the crypto-asset ecosystem reside here. (like Ox or Civic or Omisego or Golem).

Long-tail projects are only intended as applications or direct use-cases for tokens and include many potential use-cases for blockchain technology such as energy transfer, gambling, social media, advertising, donations, fundraising, loans, and even digital art or other assets.

In another embodiment, calculation of the Market Maturity factor takes into consideration "conventional" metrics, such as overall trading volume, current price (or prices), total project value (e.g., "market capitalization"), volatility measures, and others, but also includes an algorithmic approach to gauge the predictability of price, volatility, and trading volume of the crypto-assets that are evaluated. The system performs traditional modeling of capital asset pricing model (CAPM) characteristics (Beta, Alpha), Markov Chain projections of potential price movements (expected performance, upside, downside potential), and calculations of volatility, skewness, and kurtosis, to combine into factors that together concisely describe the risk of investing in a particular crypto-asset and/or portfolio of crypto-assets.

This Market Maturity score provides a single aggregate indicator of the likelihood that the market for a particular coin will change dramatically or drop to zero in the medium-term (many days, weeks, or months, rather than hours or seconds). Projects with higher Market Maturity scores tend to be more mature, and are less likely to see dramatic volatility, loss of liquidity, or significant price declines than projects with lower scores The final step to create an index (whether for a subset of crypto-assets that tracks a particular industry or level using the framework described above, or for the entire crypto industry) is to calculate scores based on the models, or "factors." Next, the variables are normalized so that each asset is directly comparable within the group being valued, and then a single valuation score is produced for each asset in the subset. The score is the main input into an index calculation. In some cases, aspects like risk and diversification across other key differentiators in the crypto industry (like consensus mechanism, different networking capabilities, etc.) can be introduced into the calculation during the creation of the final index.

Figure 6:
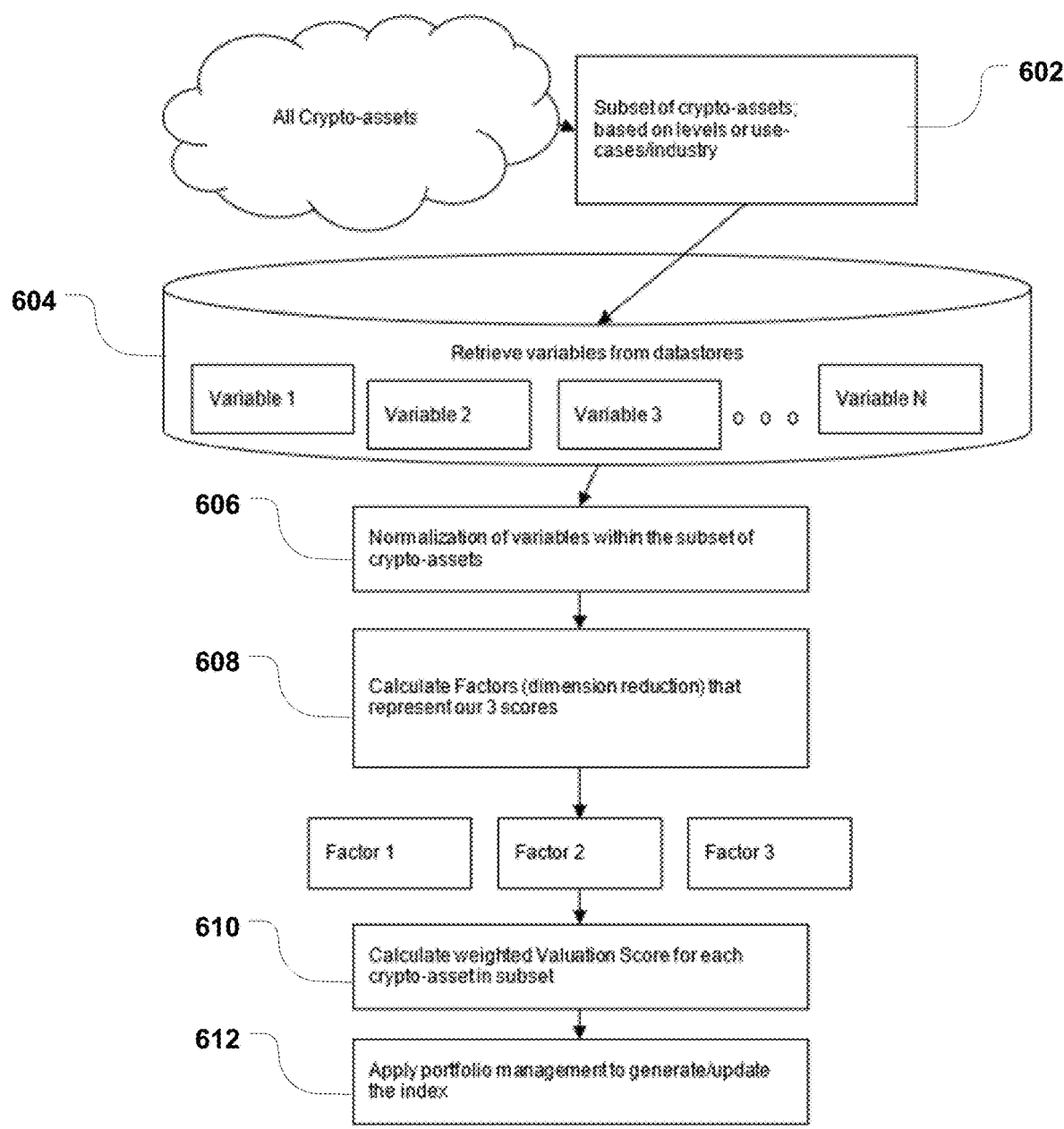
FIG. 6 depicts a method for calculating an index for a crypto-asset according to an implementation.

FIG. 6 illustrates the general flow of information and steps in the process for deriving an index. In steps 604 and 606, variables associated with various crypto-assets are retrieved from datastores and normalized within each subset of crypto-assets (subsets 602). The factors that are used to determine the fundamental health (valuation score) of each crypto-asset are calculated in step 608 (see above for detail on how each of these factors is calculated). A weighted valuation score is calculated for each crypto-asset in a subset (step 610), and this score is provided to an index calculation to generate or update a crypto-asset index (step 612).

An example of a factor equation that includes both linear and non-linear weights using the factors is:

$$F(X \sim \text{Developer Activity}) = \beta_{1i} x_1 + \beta_{2i} x_2 + \beta_{3i} x_3 + \beta_4 f(x_1, y_2, y_3) + \varepsilon_{ji}$$

where β is the weight, x and y are factors based on different data sources, F represents a non-linear combination of variables from two different sources, and ε is noise in the model.

In one implementation, Developer Activity, Project Utility, and Market Maturity are combined to produce the FCAS using a covariance-weighted average. More specifically, the system calculates the pairwise overall covariance matrix between these three factors across the assets that are tracked, and assigns weights to each of the three factors based on the inverse of the covariance between them, as described in the following equation, in which X represents each of the three FCAS components (Developer Activity, Project Utility, and Market Maturity, respectively, and μ represents the mean of each metric. In this manner, the single FCAS score reflects the unique information contained in each factor, rather than inadvertently down- or up-weighting particular pieces of information by using a naive weight.

$$FCAS = \frac{\sum_{i=1}^{3} X_i * \text{Weight}_i}{\sum_{i=1}^{3} \text{Weight}_i}$$

Where $$\text{Cov}(X_i, X_j) = E[X_i X_j] - \mu_i \mu_j$$

$$\text{Weight}_i = \frac{\sum \text{Cov}(i, j)_{i \neq j}^{-1}}{2}$$

In certain embodiments, a decentralized, algebraic mechanism is provided for securely implementing custody and access of digital assets among many parties.

Entities that provide access to and trading functionality in digital assets must provide its clients a means to safeguard digital assets, but unlike conventional securities the entity cannot (or does not wish to) have actual custody. At the same time, owners of and investors in the digital currency do not want to be responsible for safeguarding their own private keys, as misplacing keys is easy, and theft of keys is a constant threat.

To address these concerns, embodiments facilitate the implementation of a virtual custody protocol that shards or splits the private keys between multiple parties, such that no single party can access the funds. In one particular implementation, shards are evenly distributed between a counsel (acting on behalf the client), the client and the trading entity.

Figure 7A:
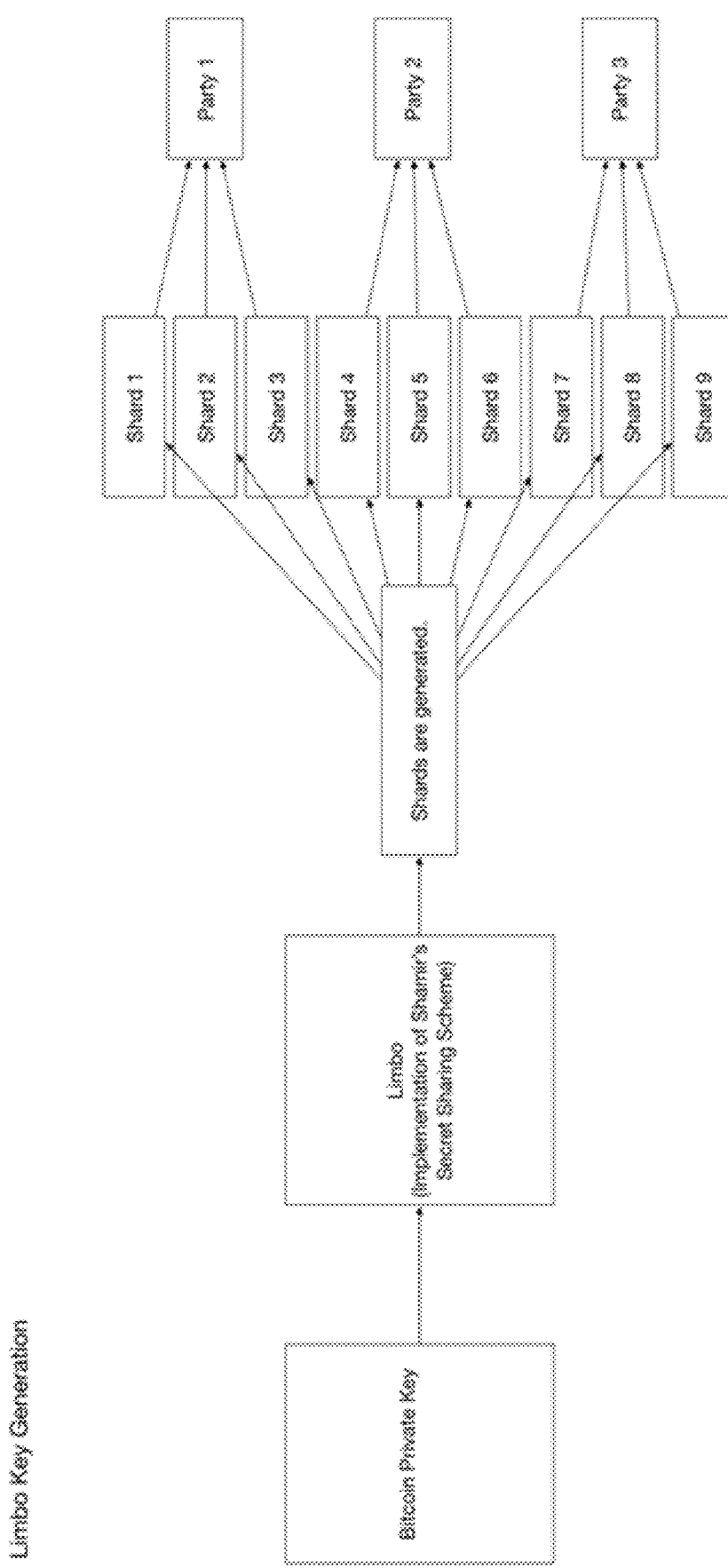
FIGS. 7A and 7B are high-level depictions of sharded key generation and recovery, respectively.
Figure 7B:
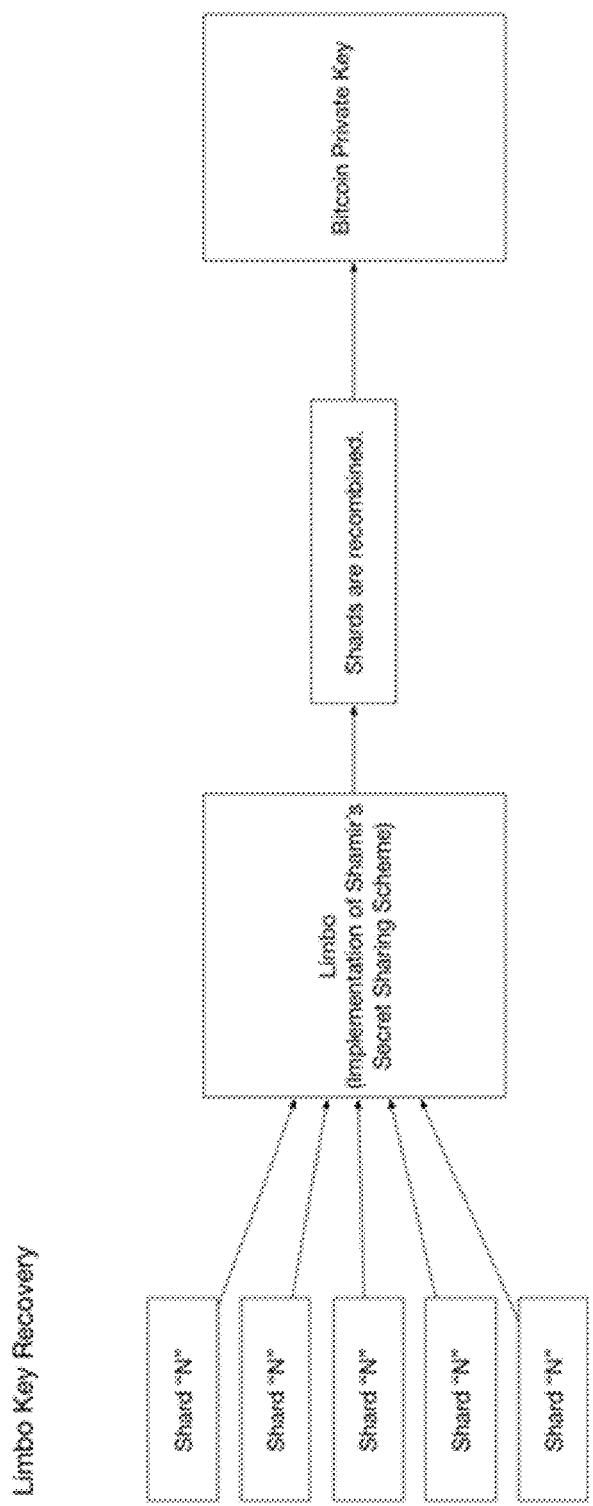

FIGS. 7A and 7B illustrate how the protocol allows funds to be safeguarded among several parties without any single party possessing custody of the assets using an algorithm rooted in cryptography known as Shamir's Secret Sharing scheme. The algorithm works by splitting or sharding a private key among multiple parties. By sharding the keys among multiple parties no single party possesses custody of the assets. Only by acting together can the shards be brought back together to recreate the original private key and access the funds. Furthermore only "X" of "N" keys must be brought back together to recreate the original key. This means that within a certain threshold keys can be lost or compromised without fear of loss of funds.

For example, if the keys are split into nine shards, each party possesses three shards. Some defined subset (usually more than half) of the shards are necessary to access and/or use the digital currency. Using the above example with nine shards, any five can be combined to regenerate the private key, meaning no single party could act alone and up to four shards can be compromised without risk of loss. The number of shards generated and minimum number that can be recombined to generate the original key are subject to the number of parties involved.

Figure 8:
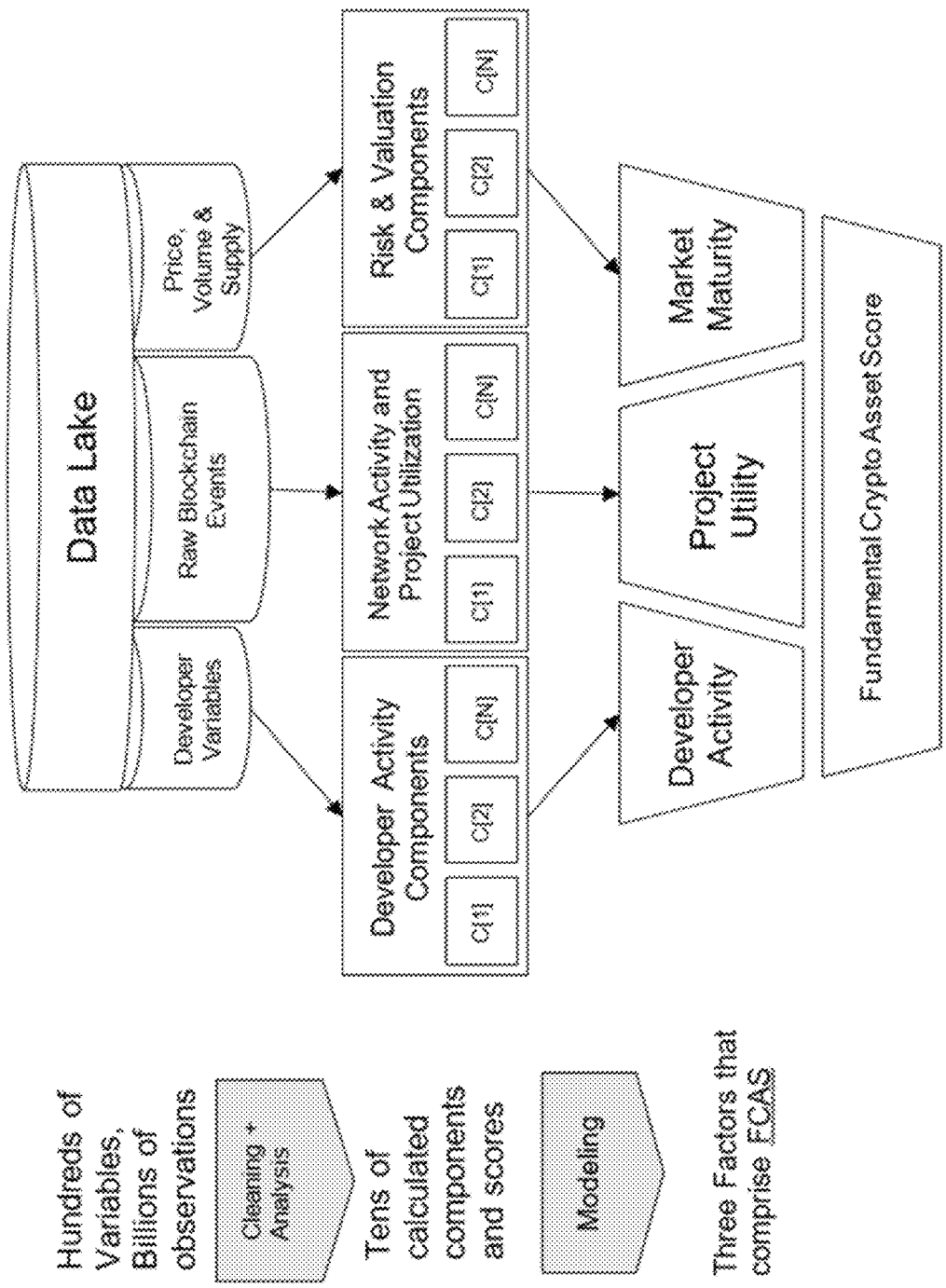
FIG. 8 is a block diagram depicting a high-level view of raw data collection within a system implementation.
Figure 9:
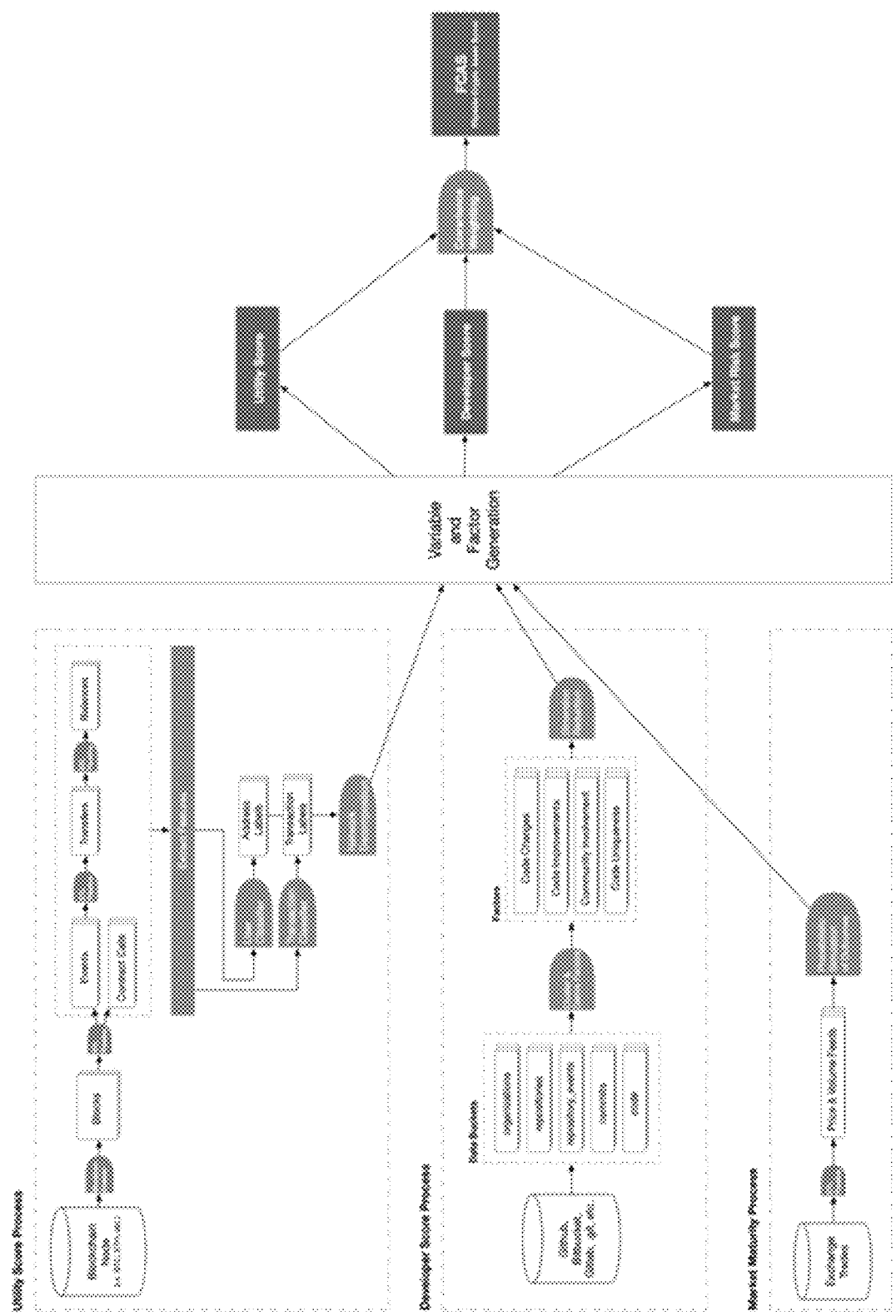
FIG. 9 is a block diagram depicting further detail of the data flow of FIG. 8.

In various implementations, a data collection and analysis process reliably and efficiently manages data from multiple complex sources, many of them massive in size (billions of observations per blockchain, hundreds of thousands for developer activity, millions for market data/prices). The process of raw data collection to an in-production score comparable across all assets is described in FIG. 8. Further, FIG. 9 depicts a more detailed representation of the high-level flow described in FIG. 8, specifically, the data management flow, as well as where the data science, and aggregation components occur throughout the process.

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

A computer system may be used in implementing the technology described in this document. General-purpose computers, network appliances, mobile devices, or other electronic systems may also include at least portions of the computer system. The computer system includes a processor, a memory, a storage device, and an input/output device. Each of the components may be interconnected, for example, using a system bus. The processor is capable of processing instructions for execution within the system. In some implementations, the processor is a single-threaded processor. In some implementations, the processor is a multi-threaded processor. The processor is capable of processing instructions stored in the memory or on the storage device.

The memory stores information within the system. In some implementations, the memory is a non-transitory computer-readable medium. In some implementations, the memory is a volatile memory unit. In some implementations, the memory is a non-volatile memory unit.

The storage device is capable of providing mass storage for the system. In some implementations, the storage device is a non-transitory computer-readable medium. In various different implementations, the storage device may include, for example, a hard disk device, an optical disk device, a solid-date drive, a flash drive, or some other large capacity storage device. For example, the storage device may store long-term data (e.g., database data, file system data, etc.). The input/output device provides input/output operations for the system. In some implementations, the input/output device may include one or more of a network interface device, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device may be implemented in a distributed way over a network, such as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. A computer-implemented method for determining the fundamental health of a crypto-asset, the method comprising:
   receiving, from one or more interfaces associated with one or more development servers associated with a crypto-asset, developer activity data associated with the crypto-asset;
   calculating a developer activity factor based on the developer activity data;
   establishing a connection to a blockchain server that maintains a blockchain that tracks transactions associated with the crypto-asset;
   receiving, from the blockchain server, transaction data for a plurality of the transactions;
   calculating a project utility factor based on a plurality of behavioral use cases derived from the transaction data, wherein the behavioral use cases are respectively associated with different uses of the crypto-asset;
   determining a fundamental health score for the crypto-asset based on the developer activity factor and the project utility factor; and
   generating a crypto-asset index using as input the fundamental health score for the crypto-asset and one or more fundamental health scores for other crypto-assets.

2. The method of claim 1, wherein the developer activity data comprises code commits, code comments, number of code pulls, frequency of code pulls, number of code pushes, frequency of code pushes, number of unique contributors, number of code forks, number of releases, frequency of releases, number of watches on code, number of issue reports, frequency of issue reports, number of posts to electronic message boards associated with the crypto-asset, and/or frequency of posts to electronic message boards associated with the crypto-asset.

3. The method of claim 1, wherein calculating the developer activity factor comprises defining a time-based factor to account for a temporal aspect of the developer activity data.

4. The method of claim 1, wherein calculating the developer activity factor comprises:
   defining a plurality of observed activity variables based on the developer activity data;
   performing factor analysis by identifying factors defining a covariance of the observed activity variables; and
   measuring a proportion of variance from results of the factor analysis.

5. The method of claim 1, wherein the behavioral use cases comprise active trading, passive trading, and/or intended use.

6. The method of claim 1, wherein calculating the project utility factor comprises:
   identifying addresses in the blockchain that have made at least one transfer of a crypto-asset; and
   classifying activities associated with the addresses into the behavioral use cases.

7. The method of claim 6, wherein calculating the project utility factor further comprises filtering the activities by excluding unintended behaviors associated with the addresses.

8. The method of claim 1, wherein calculating the project utility factor comprises differentiating among behaviors exhibited in the transaction data using probabilistic modeling, heuristics, and/or manual inspection.

9. The method of claim 1, wherein calculating the project utility factor comprises:
   forming clusters of similar transaction participants based on the transaction data;
   classifying the clusters into the behavioral use cases; and
   calculating a time-series of proportions of the behavioral use cases.

10. The method of claim 1, wherein determining the fundamental health score comprises calculating a covariance-weighted average using the developer activity factor and the project utility factor.

11. The method of claim 1, further comprising calculating a market maturity factor for the crypto-asset based on trading volume, current price, total project value, and/or volatility, and wherein the fundamental health score is further based on the market maturity factor.

12. A system for determining the fundamental health of a crypto-asset, the system comprising:
   a processor; and
   a memory storing computer-executable instructions that, when executed by the processor, program the processor to perform the operations of:
      receiving, from one or more interfaces associated with one or more development servers associated with a crypto-asset, developer activity data associated with the crypto-asset;
      calculating a developer activity factor based on the developer activity data;
      establishing a connection to a blockchain server that maintains a blockchain that tracks transactions associated with the crypto-asset;
      receiving, from the blockchain server, transaction data for a plurality of the transactions;
      calculating a project utility factor based on a plurality of behavioral use cases derived from the transaction data, wherein the behavioral use cases are respectively associated with different uses of the crypto-asset;

determining a fundamental health score for the crypto-asset based on the developer activity factor and the project utility factor; and generating a crypto-asset index using as input the fundamental health score for the crypto-asset and one or more fundamental health scores for other crypto-assets.

13. The system of claim 12, wherein the developer activity data comprises code commits, code comments, number of code pulls, frequency of code pulls, number of code pushes, frequency of code pushes, number of unique contributors, number of code forks, number of releases, frequency of releases, number of watches on code, number of issue reports, frequency of issue reports, number of posts to electronic message boards associated with the crypto-asset, and/or frequency of posts to electronic message boards associated with the crypto-asset.

14. The system of claim 12, wherein calculating the developer activity factor comprises defining a time-based factor to account for a temporal aspect of the developer activity data.

15. The system of claim 12, wherein calculating the developer activity factor comprises:
defining a plurality of observed activity variables based on the developer activity data;
performing factor analysis by identifying factors defining a covariance of the observed activity variables; and
measuring a proportion of variance from results of the factor analysis.

16. The system of claim 12, wherein the behavioral use cases comprise active trading, passive trading, and/or intended use.

17. The system of claim 12, wherein calculating the project utility factor comprises:
identifying addresses in the blockchain that have made at least one transfer of a crypto-asset; and
classifying activities associated with the addresses into the behavioral use cases.

18. The system of claim 17, wherein calculating the project utility factor further comprises filtering the activities by excluding unintended behaviors associated with the addresses.

19. The system of claim 12, wherein calculating the project utility factor comprises differentiating among behaviors exhibited in the transaction data using probabilistic modeling, heuristics, and/or manual inspection.

20. The system of claim 12, wherein calculating the project utility factor comprises:
forming clusters of similar transaction participants based on the transaction data;
classifying the clusters into the behavioral use cases; and
calculating a time-series of proportions of the behavioral use cases.

21. The system of claim 12, wherein determining the fundamental health score comprises calculating a covariance-weighted average using the developer activity factor and the project utility factor.

22. The system of claim 12, wherein the operations further comprise calculating a market maturity factor for the crypto-asset based on trading volume, current price, total project value, and/or volatility, and wherein the fundamental health score is further based on the market maturity factor.

* * * * *